US006699389B1

(12) United States Patent
Jöchle et al.

(10) Patent No.: US 6,699,389 B1
(45) Date of Patent: Mar. 2, 2004

(54) METHOD AND APPARATUS FOR REMOVING ORGANIC WASTE FROM WATER

(75) Inventors: Wolfgang Jöchle, Denville, NJ (US); Scott Charles, Harmony, PA (US); Thilo Boensch, Zelienople, PA (US)

(73) Assignee: Global United, Inc., Zelienople, PA (US)

(*) Notice: Subject to any disclaimer, the term of this patent is extended or adjusted under 35 U.S.C. 154(b) by 0 days.

(21) Appl. No.: 09/673,717
(22) PCT Filed: Apr. 20, 1999
(86) PCT No.: PCT/US99/08725
  § 371 (c)(1), (2), (4) Date: Oct. 19, 2000
(87) PCT Pub. No.: WO99/54268
  PCT Pub. Date: Oct. 28, 1999

(51) Int. Cl.[7] .............................. C02F 3/06; C02F 3/10
(52) U.S. Cl. ................. 210/600; 210/500.1; 210/903
(58) Field of Search ...................... 71/6, 12, 15, 21, 71/23; 210/610, 617, 903, 600, 500.1

(56) References Cited

U.S. PATENT DOCUMENTS

| 4,576,717 A | | 3/1986 | Collin |
| 4,676,907 A | | 6/1987 | Harrison |
| 4,721,585 A | * | 1/1988 | Melchiorri Santolini et al. ............... 210/616 |
| 4,924,808 A | | 5/1990 | Pirotte |

FOREIGN PATENT DOCUMENTS

| CH | 597107 A | * | 3/1978 |
| DE | 3.934.122 | | 4/1991 |
| DE | 59.304.165 | | 11/1996 |
| DE | 19.737.691 | | 5/1998 |
| EP | 542 162 | | 5/1993 |
| FR | 2.522.642 | | 9/1983 |
| HU | 44218 T | * | 2/1988 |
| JP | 58.130.184 | | 8/1983 |
| WO | WO 90/03352 | | 4/1990 |

OTHER PUBLICATIONS

Biddlestone Composting with Straw Waste Water Treatment 1984 Vol 27 No 9 abstract.

* cited by examiner

Primary Examiner—Stanley S. Silverman
Assistant Examiner—Maribel Medina
(74) Attorney, Agent, or Firm—Webb Ziesenheim Logsdon Orkin & Hanson, P.C.

(57) ABSTRACT

A method for removing contaminants from water involves filtering the water through a filtering apparatus which includes a porous media container having an inner chamber which is suitably configured so that water can pass through the chamber and processed straw retained within and suitably within the chamber such that when water passes through the chamber, it also passes through the straw. A method is provided for enhancing the composting (470) of organic matter, e.g., sludge, including the steps of adding processed straw to a compost mixture and digesting said mixture.

10 Claims, 3 Drawing Sheets

METHOD AND APPARATUS FOR REMOVING ORGANIC WASTE FROM WATER

BACKGROUND OF THE INVENTION

1. Field of the Invention

The present invention is directed to methods and devices for using processed straw to remove organic waste (ammonium, nitrites, nitrates, and hydrogen sulfide), from water, effluent and sludge.

2. Description of the Prior Art

Effective disposal of and recycling of organic waste can pose significant challenges. There are many techniques for removal of organic waste from water or for recycling of this waste into fertilizer. Similarly, the removal of organic waste through known processes can yield a useful fertilizer and substrate for plant growth. The availability of processed straw, manufactured according to U.S. Pat. No. 4,924,808 issued May 15, 1990, which is incorporated herein by reference, encouraged its evaluation in a broad range of applications beyond its original intended use as a cat litter.

Organic waste in water, particularly nitrogenous waste, is undesirable and must be removed before the water can be drained into waterways. Increased nutrients are known to harm the ecosystem into which the contaminated waters flow. Furthermore, organic waste, particularly nitrogenous waste, can accumulate in sources of water used in drinking or in agricultural applications as well as in closed aquatic systems, such as aquaria and closed fish and aquaculture systems.

Human and animal waste, including waste from food processing plants and effluent from aquaculture operations are sources of water-soluble nitrate-nitrogen which accumulates to dangerous levels in groundwater, drinking water, ponds, lakes, rivers and estuaries. Consequences of this build-up include poor water quality and the stimulation of unwanted and often dangerous growths of algae, which require nitrate as an essential nutrient. One example is the accumulation of nitrate in aquaria, resulting in algae blooms. A whole industry has been spawned, producing chemicals and devices for algae growth prevention, for removal of nitrogenous compounds, and for testing for levels of these compounds.

In aquaculture environments, nitrogenous waste (ammonia, nitrites and nitrates) result from the metabolic process of creatures living in a given body of water and from decay of organic matter in the water. A great deal of organic waste can accumulate in a confined body of water such as an aquarium or fishery, due to the unnatural overcrowding of animal life in these settings. Accumulation of organic waste is harmful to animal and plant life within these closed aquatic environments. While ammonia and nitrite accumulation can be particularly devastating, resulting in the rapid demise of the inhabitants of the aquarium or fishery, accumulation of nitrates is also harmful to these inhabitants. Removal of nitrogenous waste from water, including nitrates, is therefore desirable.

Contaminated water, whether in an aquarium or a fishery, or in a municipal waste facility, is generally treated similarly to convert nitrogenous waste to nitrates. Water or sludge containing nitrogenous matter, is contacted with a substrate having certain microorganism deposited thereon, where it is aerobically converted to ammonia, nitrite, and later to nitrate. The substrate is often contained within a trickle filter. The microorganisms are of the types best adapted to the nutritional and physical conditions of the treatment system and include certain aerobic chemoheterotrophic bacteria and fungi which often arise by selection from the microorganisms initially present in the waste. For instance, degradation of organic waste and/or animal metabolism often results in production of ammonia, which is aerobically converted to nitrite and then to nitrate by Nitrosomonas and Nitrobacter species, respectively. The process of conversion of ammonia to nitrate is known as nitrification.

Removal of nitrates after decay and treatment of organic matter in water can be achieved in a number of ways. In waste water treatment, the nitrate-containing water either can be discharged, or further treated to remove nitrates, often by assimilation into plant matter. In an aquarium environment, nitrates can be removed by a number of methods. The simplest method for reducing nitrates is through water changes or by assimilation into plant matter. Assimilated ammonia, nitrites and nitrates, as well as phosphates and other contaminants are removed from the enclosed aquatic system by continuous harvesting of the plant matter. Growth of and harvesting of plant matter is often effective, provided the plants and/or algae can be efficiently grown. For many reasons, efficient plant and/or algal growth may be unattainable or undesirable in certain systems as they may clog filtration and piping systems. In marine environments, protein skimming can aid in maintaining lower nutrient levels by removal of organic waste before it can be degraded to ammonia, nitrite and nitrate. Combined with low levels of denitrification (conversion of nitrate to N2) that can occur in anoxic areas of the aquatic system, nitrates can often be effectively controlled. However, achieving very low levels of nitrates through this method is often difficult or impossible to achieve, especially when fish are kept in the aquatic system.

A number of unique methods have been developed to combat accumulation of nitrates in an aquatic system which involve passing a quantity of water into a portion of a filter system where anoxic conditions are present, wherein denitrifying organisms grown. These systems can be difficult, expensive and/or complicated to maintain. There is also a risk that anaerobic production of hydrogen sulfide can result. Therefore there is a need for a simple, inexpensive and safe method for reducing nitrate levels in aquaria, aquaculture and waste water treatment systems and of hydrogen sulfide as well.

Sewage sludge is a by-product created in sewage plants during waste water treatment. A similar sludge results from agricultural waste or animal waste and effluent produced by the animal industry (cattle, especially dairy cattle, pigs, horses, intensively housed sheep and goats, poultry, and aquaculture). Treated, rotted, and partially solidified effluent and sludge is mostly spread on agricultural fields as a fertilizer and growth substrate. The benefits for the agricultural industry are that the nutrients in the effluent/sludge provide various nitrogen compounds, phosphate and potassium salts, which are important for plant growth. Favorable times for the application of sewage sludge are between Fall and Spring since most fields are easily accessible at this time, prior to cropping. However, little to no plant growth at this time makes this impractical because the nutrient use and absorption by the plants range from very little to none. In addition, large amounts of precipitation can wash out nutrients and allow the nitrogen compounds to penetrate into groundwater resources. The elution of water soluble nitrogen compounds is one of the greatest threats to ground and drinking water.

Nitrogen in sewage sludge consists mostly of ammonium-nitrogen (NH4—N). Ammonium-nitrogen is a common compound found in anaerobically rotted sludge. After sludge application, ammonium-nitrogen is converted into nitrate-nitrogen (NO3) within only a few days, making it water soluble and, thus, available to the groundwater. Drinking water has strict limits for both nitrate and ammonium.

It is therefore an object of the present invention to provide a simple, inexpensive and safe method for removal of nitrogenous waste (ammonia, nitrite and nitrate) from water and a filter apparatus for direct removal of nitrogenous waste from water.

It is a further object of this present invention to provide and improve an organic fertilizer having reduced levels of elutable nitrogen compounds, to provide a method for imparting sustained nitrogen release qualities to composted organic material, i.e., effluent/sludge, for use as fertilizer and to provide a method to increase the rate of production of fertilizer from compost.

SUMMARY OF THE INVENTION

A water filtering apparatus is provided, including a porous media container having an inner chamber and suitable configured so that water can pass through the chamber, and processed straw retaining within and suitably configured within the chamber such that when water passes through the chamber, it also passes through the straw.

A method for removing organic material from water is provided, including filtering water through a filtering apparatus which includes a porous media container having an inner chamber which is suitable configured so that water can pass through the chamber, and processed straw retained within and suitably within the chamber such that when water passes through the chamber, it also passes through the straw.

A method is provided for enhancing the composting of organic matter, including the steps of adding processed straw to a compost mixture and digesting said mixture.

DETAILED DESCRIPTION OF THE PREFERRED EMBODIMENTS

Processed straw is effective for removal of organic waste, especially nitrogenous waste, from water for improving compost based fertilizers.

Processed straw is prepared in a number of fashions. One method for manufacturing processed straw is the method of U.S. Pat. No. 4,924,808, wherein straw is dried to a moisture content of between 8% to 14% by weight, chopped, compacted into briquettes and, the, crushed into granules.

Figure 1:
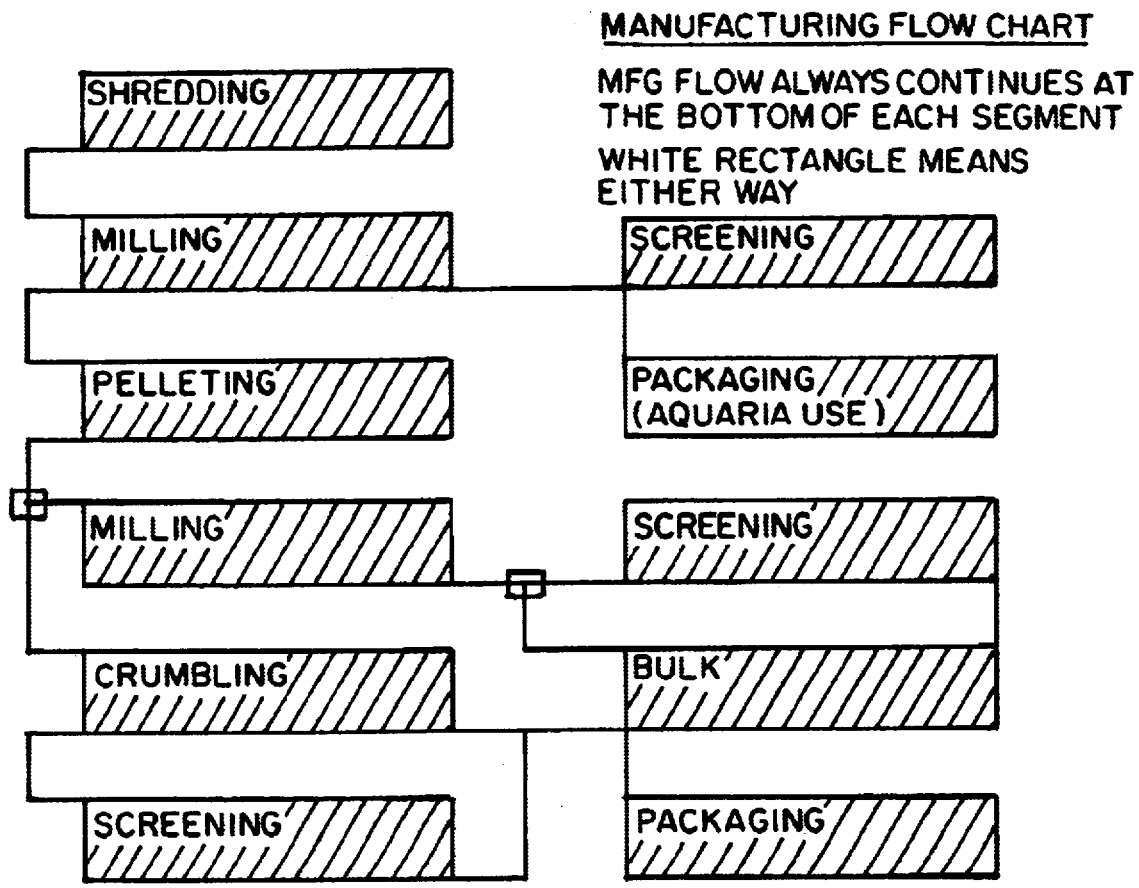
FIG. 1 is a manufacturing flow chart of the method for production of processed straw according to the present invention.

FIG. 1 shows an alternative method for preparing processed straw. Straw is dried to a moisture content of 8% to 14% and is then shredded and milled. The shredded and milled straw is screened for size. The larger sized fraction is useful in water filters. The fine straw particles which pass through the screen may be used or further processed for other purposes, such as for cat litter, according to U.S. Pat. No. 4,924,808. In the screening step, the minimum size of the retained processed straw is determined with regard to the ultimate use of the processed straw. For instance, in a water filter, the chosen size of the particles of processed straw depends upon a number of factors, such as, the choice of the media container and filtration device in which the straw is retained. Choice of particle size may further be determined by optimally balancing the surface area of the processed straw particles, the desired flow rates through the media container within the filter and/or desired rate of removal of waste. A higher surface area of the processed straw would result in a slower water flow rate, but would increase the waste-removal rate of the straw. If a filter system is used which forces pressurized water through a filter element, smaller particle sizes can be used. In any case, the processed straw particles should be larger than the openings/pores of the container in which the straw is retained.

For certain applications, shredded and milled straw, weather screened or unscreened, is further processed by compressing the processed straw into pellets and either milling or crumbling the pellets. This processed straw can be either packaged for use or screened for size, once again, according to the ultimate use of the processed straw.

Water Purification

In water, nitrogenous waste (ammonium, nitrite and nitrates) is present either in solution, as gas, or as solids. Filtering water through processed straw prevents the undesirable and/or dangerous build-up of nitrogen compounds in bodies of water, whether stagnant (ponds, lagoons, lakes without exit, fish tanks), flowing (river or raceways—either natural or artificial—or closed fish production systems with moving waters), and in moving waters in coastal and ocean rim areas (estuaries, lagoons, bays, inlets and fjords). Build-up of waste materials in these bodies can be a result of natural processes or from pollution. Filtration with processed straw also decreases the concentration of odors from nitrogenous compounds. Nitrogen binding by processed straw is, therefore, for the purpose of, removal of nitrogen compounds from water, prevention of nitrogen compounds from entering drinking water, inhibition, prevention or reduction of undesirable algae growth, production of improved fertilizer from human and animal waste, and from food processing waste, and decreasing the concentration of odors from nitrogenous compounds.

Processed straw can be used successfully to reduce nitrate levels in water over a period of days through a process not yet fully understood, but is effective in the prevention of unwanted and undesirable growth of algae.

The following examples show how processed straw achieved over time a reduction of nitrogenous compounds and adversely affected the growth of algae in closed aquatic systems.

EXAMPLE 1

Pouches containing 5 g of processed straw were used. In the first study 5 pouches were added to 1000 L of salt-water in a glass container (aquarium). The nitrate concentration went from 125 ppm to <100 ppm in 48 hours <50 ppm in 50 hours <25 ppm in 96 hours and <10 ppm in 120 hours.

EXAMPLE 2

In a second study, 2 pouches containing 5 g of processed straw have been used in three different tanks holding 460 L of fresh-water each. Nitrite levels in Tank 1 have been determined at 10 ppm, tank 2 with 20 ppm, and tank 3 with 20 ppm. After 4 days the nitrite levels had fallen to 0.1 ppm in tank 1, 2.5 ppm in tank 2, and 0.1 ppm in tank 3.

EXAMPLE 3

In this study, using the same test, algae growth was tested in only 6 L of water, using 0.8 g of processed straw. Algae growth was reduced by 44% within 8 days.

EXAMPLE 4

In a field trial, a 55 L fresh-water aquarium stocked with seahorses and starfish and heavily contaminated with hair algae was treated with one pouch containing 8 g of processed straw each week for four weeks. The nitrate concentration in the water was determined using a commercial test kit and a content of 40 ppm was shown just before treatment. Within 8 days the nitrate concentrations had fallen to 0 ppm and remained at this level. Algae disappeared over the four week period.

EXAMPLE 5

In a field trial, a 380 L salt-water aquarium contaminated with green and brown algae was treated with a pouch containing 8 g of processed straw. The nitrate levels dropped from 40 ppm to 0 ppm within 3 days and remained at that level at the end of the observation period of 8 weeks. Algae disappeared after 3 weeks.

EXAMPLE 6

In a field trial, a 180 L fresh-water aquarium was treated with a pouch containing 6 g of processed straw, reducing nitrate levels from 40 ppm to 0 ppm within 3 days.

These results clearly indicate a significant reduction of nitrogenous compounds at all degrees of salinity, and, consequently, a sharp reduction in the growth of algae, as a side effect, resulting from treating contaminated water with processed straw. Significant results may be seen already within three to four days after treatment commenced. Preferably, the amount of straw is 0.002% to 1.25% by weight of the total volume of water to be filtered in a closed system, such as, in an aquarium or closed aquaculture facility. The total volume of water to be filtered is equal to the volume of water contained in the closed aquatic system, including, but not limited to, water in sumps, filters, protein skimmers and tubes or pipes.

The type of filtering device or apparatus in which the processed straw is used is a matter of choice. The filtering apparatus includes a porous media container having an inner chamber and configured to allow passage of water through the chamber. Processed straw is retained within the chamber and is suitable configured therein so that water which passes through the chamber also passes through the processed straw. For instance, suitable media containers include, without limitation, pouches, including fabric or mesh pouches and plastic cages or boxes. Processed straw can be used in canister filters, hang-on filters, in sumps or placed directly into the body of water to be filtered.

Figure 2:
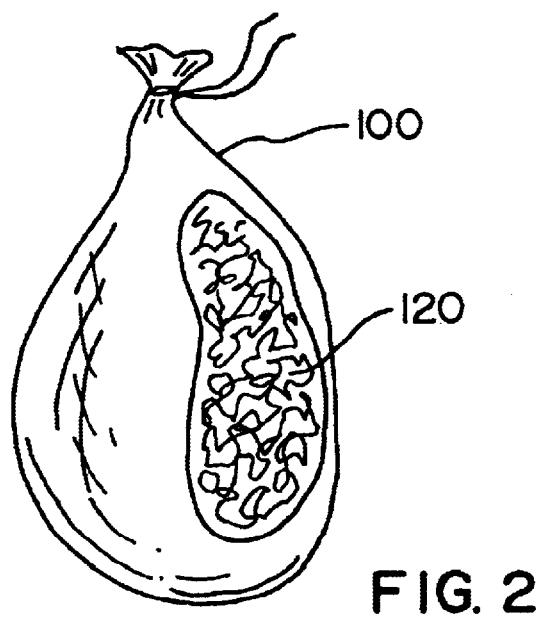
FIG. 2 is a partially broken-away perspective view of a filter bag according to a first embodiment of the present invention.

FIG. 2 is a cut-away elevational view of a first embodiment of the present invention. A typical commercially available mesh filter bag 100 is packed with processed straw 120. The filter bag 100 may be inserted directly into a body of water to be treated, or it can be inserted into a suitable filter apparatus, including, without limitation, canister filters, hang-on-tank filters, sumps and sump filters or in-line with a water pump. Like numbers in FIGS. 3 and 4, refer to like elements in FIG. 2.

Figure 3:
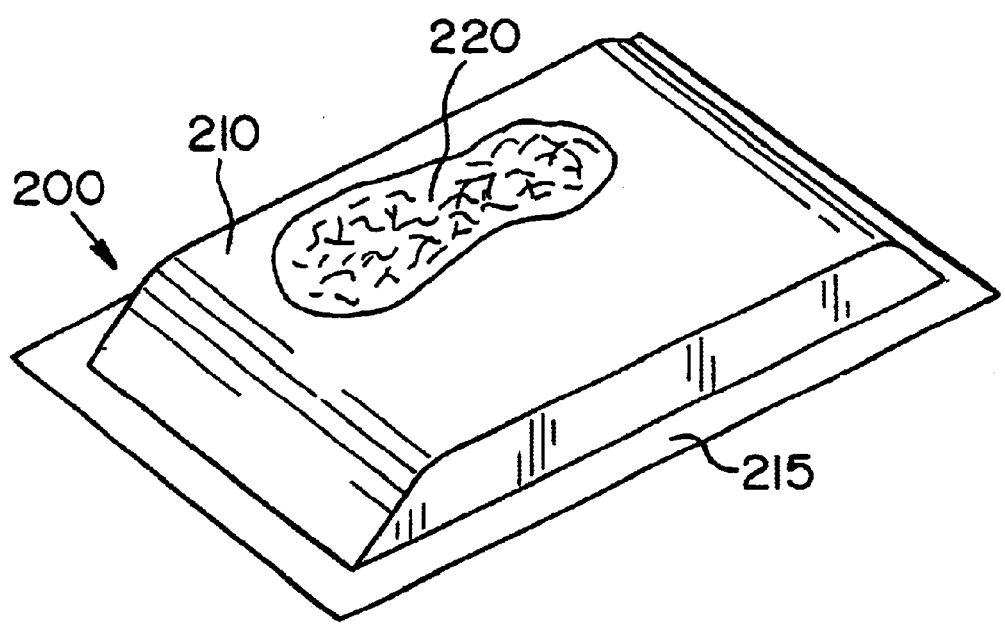
FIG. 3 is a partially broken-away perspective view of a filter pouch according to a second embodiment of the present invention.

FIG. 3 is a cut-away perspective view of a second embodiment of the present invention. A filter pouch 200 is provided. The filter pouch 200 is formed from a mesh pocket 210 and has a seal 215 in this embodiment. Processed straw is retained within the mesh pocket 210. The filter pouch 200 can be suitably sized and shaped to fit commercially available filters and filter chambers. The seal 215 is optional, depending upon the configuration of the filter pouch 200 and the material used from the mesh pocket 210.

Figure 4:
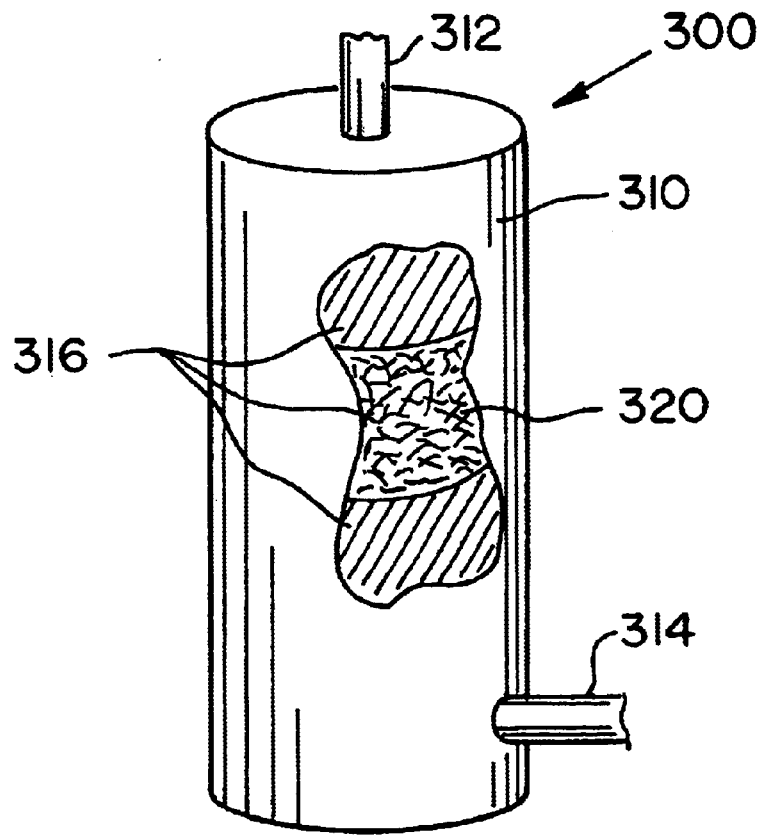
FIG. 4 is a partially broken-away perspective view of a canister filter according to the third embodiment of the present invention.

FIG. 4 is a cut-away elevational view of a third embodiment of the present invention. A canister filter 300 is provided. The canister filter 300 includes a housing 310, a water inlet 312 and a water outlet 314. The housing 310 is suitably configured to allow water which is siphoned, pumped or otherwise taken from a body of water (not shown) to pass from the inlet 312, through any media 316 within the canister filter 300 and to the outlet 314 for return to the body of water. The media 316 includes processed straw 320. The filter bag 100, the filter pouch 200 and the canister filter 300 are, without limitation, separate, but equivalent, embodiments of the media container of the present invention.

Figure 5:
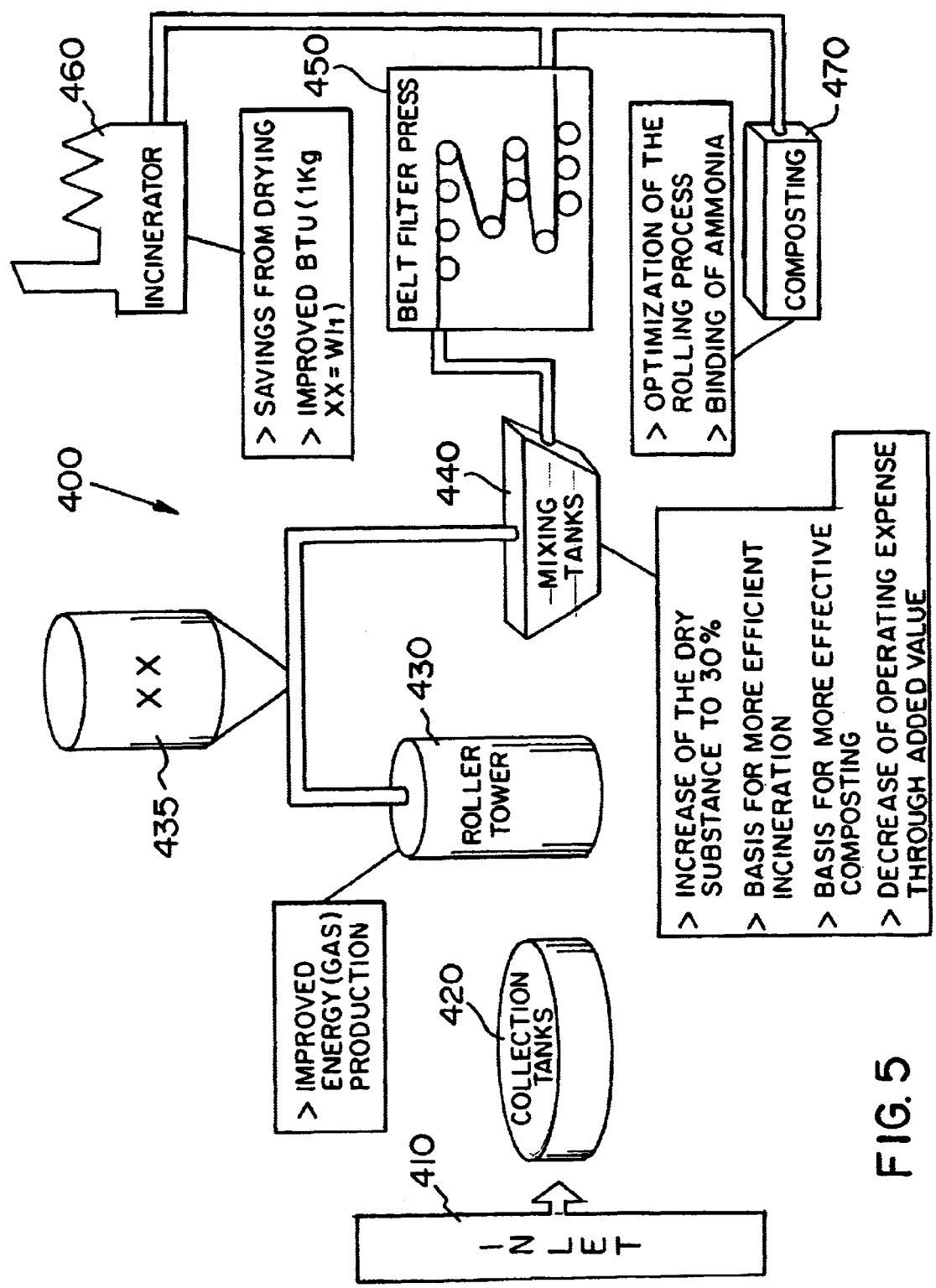
FIG. 5 is a schematic diagram of a sewage sludge treatment system according to the present invention.

FIG. 5 shows a flow diagram of a typical integrated sewage sludge treatment system and illustrates a method for processing sludge, utilizing the methods of the present invention with regard to processing sludge to produce a fertilizer. The sludge treatment system 400 includes a sludge inlet 410; a collection tank 420 in which sludge is collected and a rotting tower 430 in which the sludge is anaerobically fermented or digested in the presence of processed straw.

Anaerobically digested sludge is sent from the rotting tower 430 to mixing tanks 440 wherein the water content of the rotted sludge is reduced to about 70% for better incineration and/or composing. Drying the rotted sludge decreases operating expenses in a sludge treatment system. Water is further removed trough press systems such as a belt filter, screw press, frame press etc. 450 and the dried, rotted sludge is either incinerated in an incinerator 460, producing further energy and/or composted in a composter 470 with processed straw, for use as fertilizer. Water extracted in this system and according to this method can be filtered through processed straw according to the present invention to remove waste therein.

Effluent/Sludge Treatment

The following are typical results from studies and field trials confirming this invention's purpose with regard to reduction of water soluble nitrogen from sludge during treatment of human and animal waste, including waste from the food processing industry, by adding processed straw.

Effluent/sewage sludge is a by-product created in sewage plants during waste water treatment. Sludge also results from agricultural waste or animal waste produced in the animal industry (cattle, especially dairy cattle, pigs, horses, intensively housed sheep and goats, poultry, and aquaculture). Hence the term "sludge" used in this invention encompasses, without limitation, waste of plants human and/or animal origin, and the by-products from the food processing industry, such as dairy facilities, cheese factories, rendering plants, abattoirs, facilities for the canning and processing of fruit and vegetables, farms and the like.

This invention describes the beneficial effects realized from the addition of processed straw to sludge, when followed by a brief anaerobic rotting or aerobic composting method. Namely, addition of processed straw reduces the content of elutable nitrogen compounds, thus preventing loss of nutrients, as well as groundwater contamination. For this procedure processed straw is added to wet effluent/sludge. Preferably the mixture of sludge and processed straw is 0.1% to 10% by weight, processed straw. The sludge mixture is composted, or rotted, resulting in a superior fertilizer with reduced quantities of elutable nitrogen compounds. Any form of processed straw may be used.

During the intensive rotting process, all easily degraded substances, mainly from the sludge, are eliminated. An increase of rotting bacteria occurs at the same rate as the degradation. This growth in bacterial population requires nutrients which the bacteria also extract from the sewage sludge. Water soluble nitrogen compounds such as ammonium and nitrate are required by the microorganisms in order to produce bacterial protein mass. Nutrients absorbed by the microorganisms are incorporated into proteins are protected from elution.

Since the nitrogen compounds in sludge prepared according to the present invention are contained in microbial protein, continuous degradation allows for a slow and gradual release of the nutrients after the processed sludge is applied as fertilizer to the land. Depending on soil temperature and soil moisture level, the microorganisms die off over several weeks and the organically bound nitrogen therein is again mineralized, making these nutrients available during times of increased plant growth.

For instance, during normal springtime growth, plants can absorb the slowly released nitrogenous compounds without elution of nitrogenous compounds into the soil or groundwater.

EXAMPLE 1

In one study, pure sludge was found to contain 56 mg per liter of soluble, extractable nitrogen in the form of ammonium-nitrogen. The mixture of sludge and processed straw, prior to composting contained 73 mg/l of ammonium-nitrogen. After 14 days of processing, the sludge and straw mixture showed a content of only 3 mg/l of extractable ammonium-nitrogen. None of the three samples studied showed any nitrate concentrations. Thus, adding processed straw reduced the soluble nitrogen (washout nitrogen) from 73.8 mg/l to 3 mg/l, a reduction of 96%. It is important to note that the nitrogen had not been lost through the process but rather had been absorbed into the biomass of the microorganisms of the processed straw, protecting it from elution.

EXAMPLE 2

In a second study, a laboratory scale procedure was utilized for the analysis. Each unit was comprised of a 5 L glass sealed vessel containing approximately 2 L swine manure with a dry solid contend of 2%. All analytical procedures were in accordance to EPA and ASTM methods.

A 0.5% addition of processed straw has shown to decrease ammonia volatilization from the slurry by approximately 20% for up to 1 day post addition. Atmospheric hydrogen sulfide release, was also shown to be inhibited.

EXAMPLE 3

A large scale study, using 55 Gallon containers filled with swine manure from a breeding facility, showed a reduction of nitrogen ammonia by 66% and a reduction of hydrogen sulfide by 32% during the early phase of rotting, using a 0.5% addition of processed straw.

The objects of the invention have been met. A simple, inexpensive and safe method and apparatus for removing nitrogenous compounds from water is described herein. Processed straw is inexpensive and easy to use and is shown effectively to remove nitrogenous waste compounds from water under safe aerobic conditions. Furthermore, a fertilizer and a method for production thereof from sludge is provided resulting in a fertilizer which is rapidly produced from sludge and having sustained nitrogen release capabilities.

Lastly, an integrated system is provided, utilizing all facets of the present invention with improvement in the effectiveness of and the economy of sludge reclamation as compared to such systems known in the art.

The above invention has been described with reference to the preferred embodiment. Obvious modifications and alterations will occur to others upon reading and understanding the preceding detailed description. It is intended that the invention be construed as including all such modifications and alterations.

What is claimed is:

1. A method of reducing water soluble nitrogen in water in a closed aquatic system comprising:

processing straw by drying, shredding, and milling it;

screening the milled straw;

enclosing larger fractions of the processed straw within one or more water penetrable containers formed from a material selected from the group consisting of fabric, metal, synthetic solid, and fiber, and adding the container bound straw to the water in the closed aquatic system in a weight ratio of straw to water of 0.002% to 1.25%.

2. The method of claim 1, wherein the straw is dried to a moisture content of 8% to 14%.

3. The method of claim 1, wherein the straw is further processed by compacting it into briquettes, then crushing it into granules.

4. The method of claim 1, wherein the closed aquatic system is selected from the group consisting of an aquarium, a fishery, and a pond.

5. The method of claim 1, wherein the container of straw is added directly to the water.

6. The method of claim 1, wherein the container is selected from the group consisting of a mesh pouch, a canister filter, and a hang-on filter.

7. A method of reducing water soluble nitrogen in water in a closed aquatic system comprising:

processing straw by drying, shredding, and milling it;

enclosing the processed straw within one or more containers; and filtering the water in the closed aquatic system through the straw.

8. The method of claim 7, wherein the container is placed in-line with a water pump to filter the water through the straw.

9. The method of claim 7, wherein the straw is placed in a canister filter having a water inlet and a water outlet thereon.

10. The method of claim 7, wherein the container is a mesh pouch made of fabric.

* * * * *